(12) United States Patent
Gao et al.

(10) Patent No.: US 11,855,821 B2
(45) Date of Patent: Dec. 26, 2023

(54) METHODS AND APPARATUSES FOR SYNCHRONOUS SIGNAL TRANSMISSION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 1304 days.

(21) Appl. No.: 16/338,351

(22) PCT Filed: Sep. 30, 2016

(86) PCT No.: PCT/CN2016/101129
§ 371 (c)(1),
(2) Date: Mar. 29, 2019

(87) PCT Pub. No.: WO2018/058547
PCT Pub. Date: Apr. 5, 2018

(65) Prior Publication Data
US 2019/0229961 A1   Jul. 25, 2019

(51) Int. Cl.
*H04L 27/26* (2006.01)
*H04J 11/00* (2006.01)

(52) U.S. Cl.
CPC ........ *H04L 27/261* (2013.01); *H04J 11/0073* (2013.01); *H04J 11/0076* (2013.01); *H04L 27/2666* (2013.01)

(58) Field of Classification Search
CPC ................ H04L 27/261; H04L 27/2666; H04J 11/0073; H04J 11/0076
See application file for complete search history.

(56) References Cited

U.S. PATENT DOCUMENTS

2008/0310567 A1* 12/2008 Popovic .............. H04L 27/2655
375/354
2010/0034305 A1   2/2010 Popovic
(Continued)

FOREIGN PATENT DOCUMENTS

CN          101299742 A      11/2008
CN          101502018 A       8/2009
(Continued)

OTHER PUBLICATIONS

Written Opinion of the International Searching Authority of PCT/CN2016/101129 dated Jun. 23, 2017.
(Continued)

*Primary Examiner* — Minh Trang T Nguyen
(74) *Attorney, Agent, or Firm* — Sughrue Mion, PLLC

(57) ABSTRACT

Embodiments of the present disclosure relate to methods and apparatuses of synchronization signal transmission and receiving in a wireless communication system. The method of synchronization signal transmission in a wireless communication system may comprise transmitting a signal set containing one or more synchronization signals, wherein the one or more synchronization signals are transmitted in a predetermined signal transmission pattern within a signal transmission period, and wherein the predetermined signal transmission pattern indicates information on synchronization signal transmission. With embodiments of the present disclosure, it may indicate the information on synchronization signal transmission information by means of the signal transmission mode. Thus, especially for an initial access process, it can provide a common frame for both single beam based deployment and multi-beam based deployment.

7 Claims, 12 Drawing Sheets

(56) References Cited

U.S. PATENT DOCUMENTS

| | | | |
|---|---|---|---|
| 2010/0135150 A1 | 6/2010 | Berggren | |
| 2014/0010131 A1* | 1/2014 | Gaal | H04L 5/001 370/311 |
| 2015/0289220 A1 | 10/2015 | Kim et al. | |
| 2016/0278030 A1* | 9/2016 | Yi | H04W 16/32 |
| 2016/0337159 A1* | 11/2016 | Seo | H04L 27/2662 |
| 2017/0251441 A1* | 8/2017 | Axnäs | H04B 7/0491 |
| 2019/0044782 A1* | 2/2019 | Zeng | H04W 72/21 |

FOREIGN PATENT DOCUMENTS

| | | |
|---|---|---|
| CN | 103313377 A | 9/2013 |
| CN | 104854929 A | 8/2015 |
| WO | 2008/075881 A2 | 6/2008 |

OTHER PUBLICATIONS

International Search Report of PCT/CN2016/101129 dated Jun. 23, 2017.

* cited by examiner

600 transmitting a signal set containing one or more synchronization signals, — 601
wherein the one or more synchronization signals are transmitted in a predetermined signal transmission pattern within a signal transmission period, and wherein the predetermined signal transmission pattern indicates information on synchronization signal transmission

METHODS AND APPARATUSES FOR SYNCHRONOUS SIGNAL TRANSMISSION

FIELD OF THE INVENTION

The non-limiting and exemplary embodiments of the present disclosure generally relate to the field of wireless communication techniques, and more particularly relate to methods and apparatuses for synchronous signal transmission in a wireless communication system.

BACKGROUND OF THE INVENTION

New radio access system, which is called as NR system for short, is the next generation communication system. In Radio Access Network (RAN) #71 meeting for the third generation Partnership Project (3GPP) working group, study of NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, ultra reliable and low latency communications.

Among others, aspects related to initial access and mobility are also required to be studied to discuss physical layer aspects related to initial access and mobility, by considering beamforming schemes for standalone operations and non-standalone operations.

In RAN #86 meeting, it was agreed that:
RAN1 should strive for a common framework, including for example structure of synchronization signals, for initial access.
More specifically, especially within a group of frequency bands in the frequency range, RAN1 should strive for an unified framework covering:
Single beam based and multi-beam based deployments
TDD and FDD operations
Different/mixed numerologies
Standalone and non-standalone operations
Licensed band and unlicensed band operations Thus, according to requirements for the NR system as indicated in the RAN #86 meeting, it was proposed to use a common framework for synchronization signals, for initial access and at the same time, both single beam based deployment and multi-beam based deployment will be both used.

For illustrative purposes, FIG. 1 illustrates an initial access procedure. As illustrated in FIG. 1, the initial access procedure 100 includes a Primary Synchronization signal (PSS) detection 101, a Secondary Synchronization Signal (SSS) detection 102 and Physical Broadcast Channel (PBCH) decoding 103. The PSS detection is to detect slot timing to learn physical layer identifier (ID); the SSS detection is to detect radio frame timing to learn Cell Identity (ID), detect a cyclic prefix length to learn a cyclic prefix type, an detect Time Division Duplex/Frequency Division Duplex (TDD/FDD) mode to learn a duplex mode; and the PBCH decoding is to detect the PBCH timing and make a system information access to obtain system information from the broadcast channel.

In each of a TDD cell and a FDD cell, positions of PSS and SSS in a frequency domain are fixed within central 6PRB, and the positions of PSS and SSS has a fixed relationship in a time domain. In the TDD cell and the FDD cell, the PSS and the SSS have different fixed time relationship, or in other words, there are different time interval between the PSS and the SSS, which can be used to differentiate different duplex modes. For illustrative purposes, reference will be made to FIG. 2 to describe the synchronization signal structure in LTE systems. As illustrated in FIG. 2, in an FDD cell, the PSS is always located in the last symbol of the first and eleventh time slots of each radio frame. The SSS is located in a symbol immediately preceding the PSS; while in a TDD cell, the PSS is located in the third symbol of the third and thirteen time slots and the SSS is located at a symbol three symbols earlier than the PSS.

In the NR system, both the single beam based deployment and the multi-beam based deployment will be used. Specifically, the single beam based deployment is used for a low frequency scenario and the multi-beam based deployment is used for a high frequency scenario so as to compensate path-loss. FIG. 3 illustrates the single beam based deployment and the multi-beam based deployment. As illustrated in FIG. 3, for the low frequency scenario, only a single beam is used to cover the whole cell while in the high frequency scenario, multiple beams with high directivities, such as directional beams B1 to B5, are used together to cover the cell.

Regarding the multi-beam based deployment, for example, in 3GPP TSG RAN working group (WG) 1 meeting #86, there was a discussion on a solution of beam scanning in a time division multiplexing (TDM) manner, which is illustrated in FIG. 4 for illustrative purposes. In the proposed solutions, five beams B1 to B5 are used to transmit synchronization signals and it performs a beam scanning in the time domain, i.e., and cyclically transmitting the synchronization signals with five directional beams, one direction at a time. However, in the proposed solution, if different numbers of beams are supported, the transmission timings will be quite agnostic. For an initial access procedure, in which the UE does not know the number of beams to be used since at this point it almost knows nothing about the network, there will be an issue on timing detection.

SUMMARY OF THE INVENTION

In the present disclosure, there is provided a new solution for synchronization signal transmission and receiving in a wireless communication system, to mitigate or at least alleviate at least part of the issues in the prior art.

According to a first aspect of the present disclosure, there is provided a method of synchronization signal transmission in a wireless communication system. This method could be performed at a serving node, for example a BS, like a node B (NodeB or NB). The method may comprise transmitting a signal set containing one or more synchronization signals, wherein the one or more synchronization signals are transmitted in a predetermined signal transmission pattern within a signal transmission period, and wherein the predetermined signal transmission pattern indicates information on synchronization signal transmission.

According to a second aspect of the present disclosure, there is provided a method of synchronization signal receiving in a wireless communication system. This method can be performed at a terminal device, for example UE, or other like terminal devices. The method may comprise receiving a signal set containing one or more synchronization signals; and determining a predetermined signal transmission pattern in which the one or more synchronization signals are transmitted within a signal transmission period, to obtain information on synchronization signal transmission indicated by the predetermined signal transmission pattern.

According to a third aspect of the present disclosure, there is provided an apparatus of synchronization signal transmission in a wireless communication system. This apparatus could be implemented at a serving node, for example a BS, like a node B (NodeB or NB). The apparatus may comprise a signal transmission module, configured to transmit a signal set containing one or more synchronization signals. The signal transmission module can be further configured to transmit the one or more synchronization signals in a predetermined signal transmission pattern within a signal transmission period, and wherein the predetermined signal transmission pattern indicates information on synchronization signal transmission According to a fourth aspect of the present disclosure, there is provided an apparatus of synchronization signal receiving in a wireless communication system, This apparatus could be implemented at a terminal device, for example UE, or other like terminal devices. The apparatus can comprise a signal receiving module and a pattern determination module. The signal receiving module may be configured to receive a signal set containing one or more synchronization signals. The pattern determination module may be configured to determine a predetermined signal transmission pattern in which the one or more synchronization signals are transmitted within a signal transmission period, to obtain information on synchronization signal transmission indicated by the predetermined signal transmission pattern.

According to a fifth aspect of the present disclosure, there is provided a computer-readable storage media with computer program code embodied thereon, the computer program code configured to, when executed, cause an apparatus to perform actions in the method according to any embodiment in the first aspect.

According to a sixth aspect of the present disclosure, there is provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

With embodiments of the present disclosure, it provides a new solution for synchronization signal transmission in a wireless communication system, in which the one or more synchronization signals are transmitted in a predetermined signal transmission pattern within a signal transmission period, and wherein the predetermined signal transmission pattern indicates information on synchronization signal transmission. In such a way, it is possible to use the signal transmission pattern to indicate information on synchronization signal transmission like transmission time index. Thus, especially for an initial access process, it can provide a common frame for both single beam based deployment and multi-beam based deployment.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Figure 1:
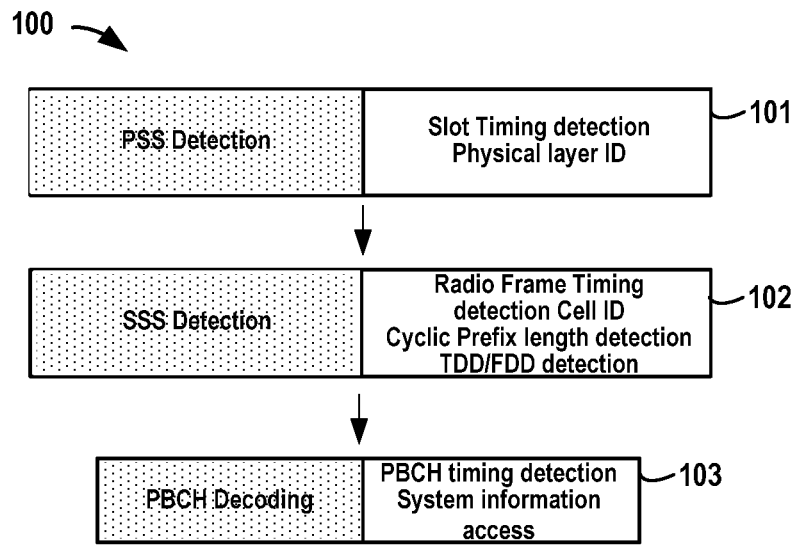
FIG. 1 schematically illustrates an initial access procedure.
Figure 2:
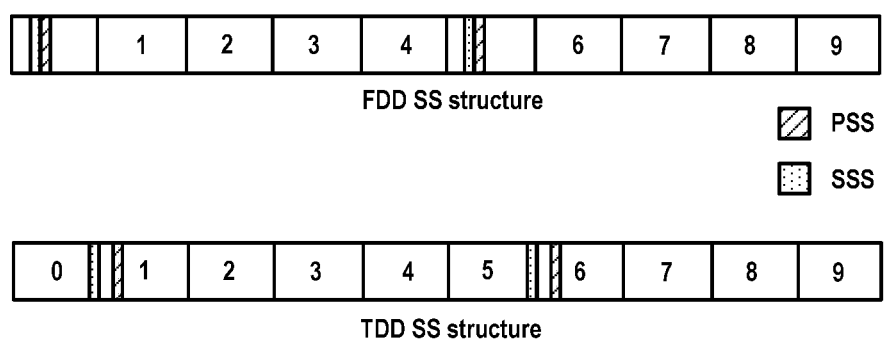
FIG. 2 schematically illustrates synchronization signal structures in FDD and TDD systems.
Figure 3:
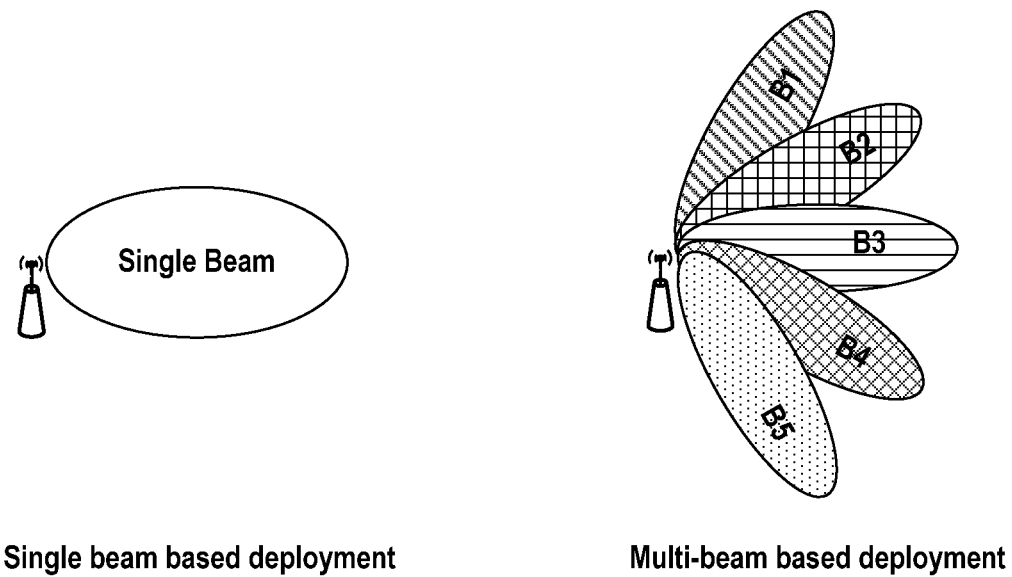
FIG. 3 schematically illustrates a single beam based deployment and a multi-beam based deployment.
Figure 4:
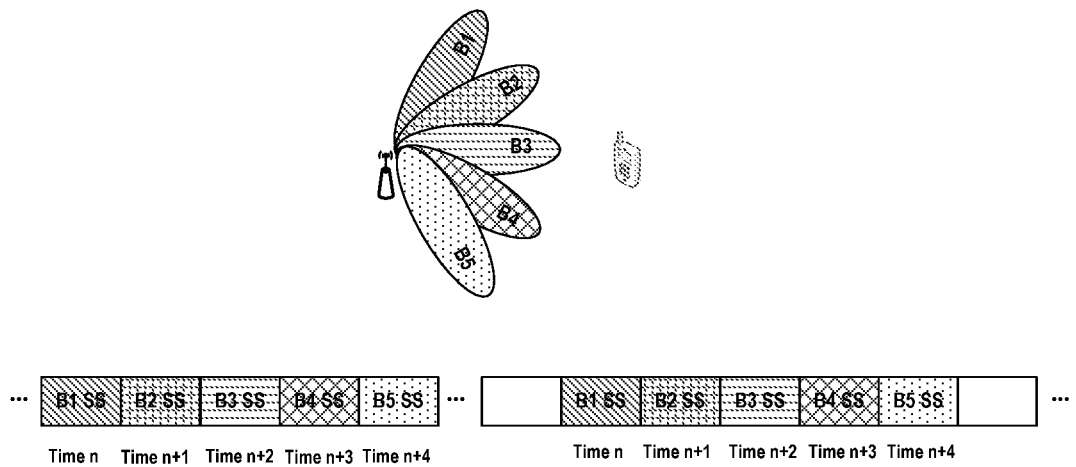
FIG. 4 schematically illustrates a solution of beam scanning in a time division multiplexing (TDM) manner in an existing solution.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

As mentioned hereinabove, in the existing solution, for different numbers of beams, the transmission timings will be quite flexible, while for an initial access procedure, UE does not know the number of beams to be used since at this point, it almost knows nothing about the network. Thus, in a case that both a single beam based deployment and a multi-beam based deployment are supported, there will be an issue on timing detection for the UE. In order to make the skilled in the art understand the problems completely and thoroughly, reference will be first made to FIG. 5 to describe the timing detection issue.

Figure 5:
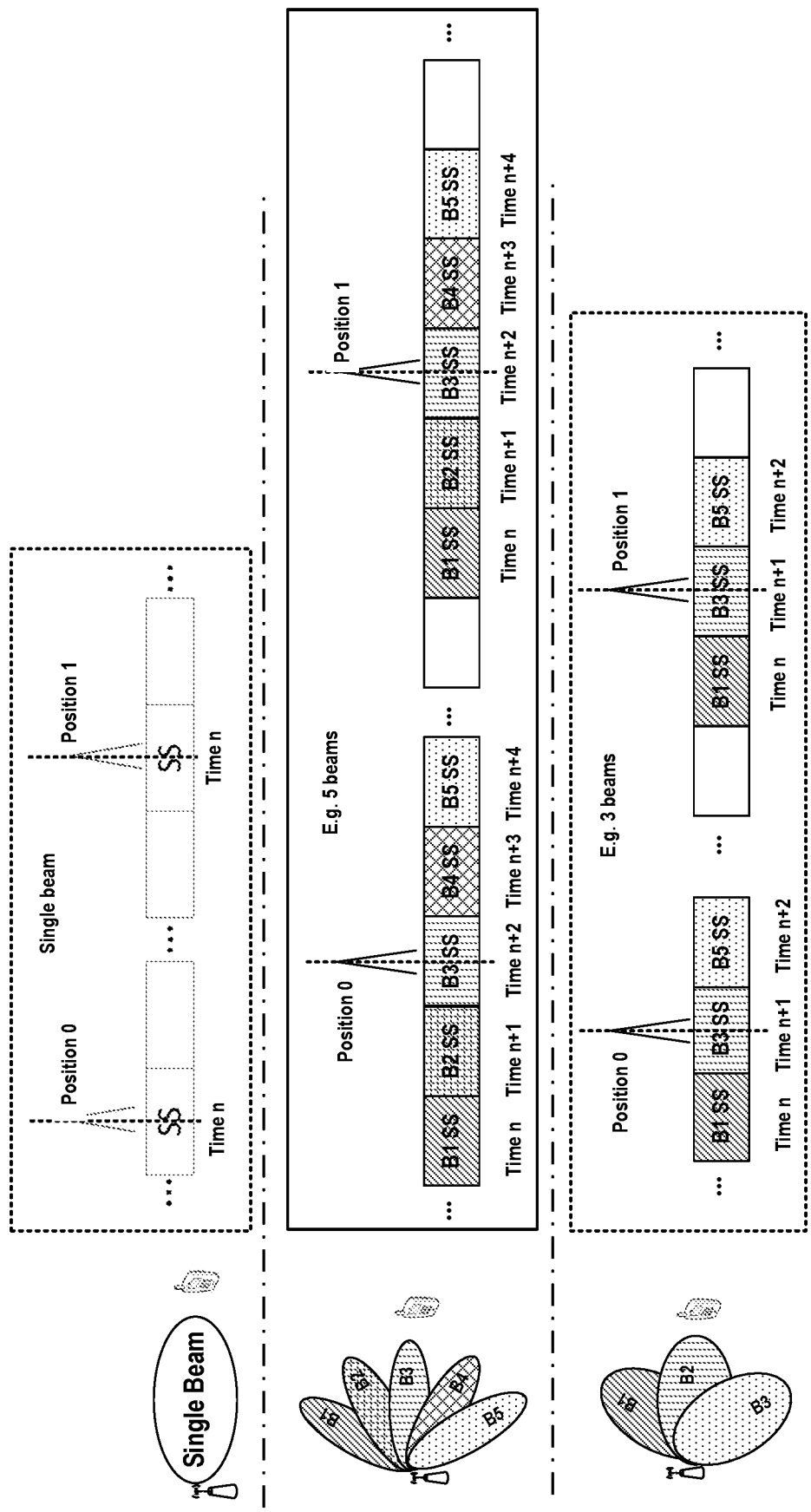
FIG. 5 schematically illustrates beam scanning for single beam based deployment and two example multi-beam based deployments in an existing solution.

FIG. 5 respectively illustrates a single beam based deployment and two example multi-beam based deployment including five beams and three beams. It is known that synchronization is a first step to access the network and thus the UE has no idea of synchronization signal configurations (e.g. beam number, beam index, etc.). In such a case, the UE can blindly detect synchronization positions by detecting the energy peaks of synchronization, like positions 0 and 1, however it does not the exact transmission time index. As illustrated in FIG. 5, in each of three scenarios, the UE can obtain synchronization and symbol boundary with blindly detection, but the exact positions at which the synchronization signals are detected are quite flexible. For example, as illustrated in FIG. 5, it is located at time n for the single beam based deployment, at time n+2 for five-beam based deployment and at time n+1 for three-beam based deployment. Thus, although the UE can blindly detect the signal peak at position 0 or 1 but it has no idea about which time index the position corresponds to since in the initial access procedure, the UE has little knowledge about that. In other words, it cannot obtain the exact time index in the initial access procedure.

To this end, in embodiments of the present disclosure, there is proposed a solution for synchronization signal transmission and receiving. In the solution as proposed herein, the one or more synchronization signals are transmitted in a predetermined signal transmission pattern within a signal transmission period, and wherein the predetermined signal transmission pattern is used to indicate information on synchronization signal transmission, like the transmission time index for the synchronization signals. In such a way, it is possible to use the signal transmission pattern to indicate information on synchronization signal transmission like the transmission time index, which is rather useful especially for an initial access process. In addition, it is also possible to use the signal transmission to indicate other information on the synchronization signal transmission, like transmission frequency index, beam index, Cell ID, cyclic prefix length, duplex mode, other information or the combination thereof. Hereinafter, reference will be made to the accompanying drawings to describe the solution for synchronization signal transmission and receiving as proposed herein.

Figures 6, 8:
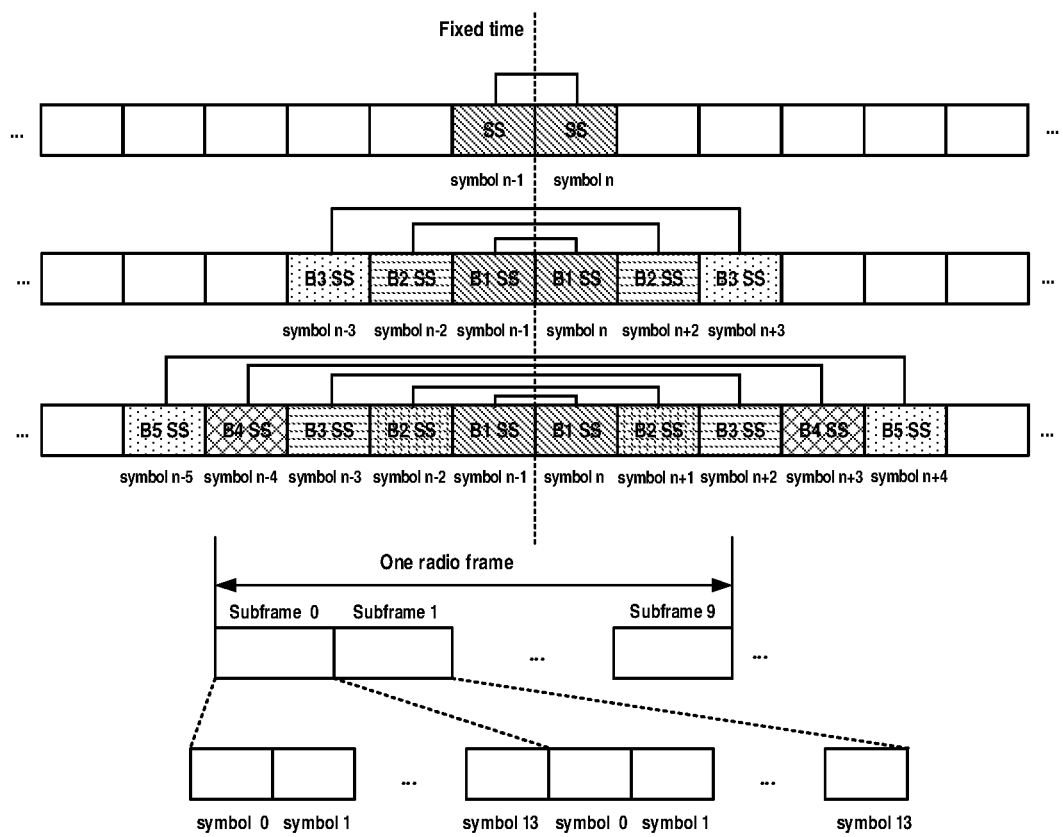
FIG. 6 schematically illustrates a flow chart of a method for synchronization signal transmission according to an example embodiment of the present disclosure.
FIG. 8 schematically illustrates an example signal transmission pattern for synchronization signal transmission in the time domain according to an embodiment of the present disclosure.

Reference is first made to FIG. 6, which schematically illustrates a flow chart of a method 600 of synchronization signal transmission in a wireless communication system according to an embodiment of the present disclosure. The method 600 can be performed at a serving node, for example a BS, like a node B (NodeB or NB).

As illustrated in FIG. 6, first in step 601, a signal set containing one or more synchronization signals is transmitted. Particularly, the one or more synchronization signals can be transmitted in a predetermined signal transmission pattern within a signal transmission period, and the predetermined signal transmission pattern can indicate information on synchronization signal transmission.

Thus, it can be seen that, in embodiments of the present disclosure, it is to use the signal transmission pattern in which the one or more synchronization signals are transmitted within a signal transmission period to indicate information on synchronization signal transmission. In such a way, it is possible to tell UE additional information so that the UE could know information for synchronization signals, especially in the initial access procedure. Hereinafter, the transmission time index will be taken as an example for the information on synchronization signal transmission. However, the present disclosure is not limited thereto, it is also possible to use the signal transmission pattern to indicate other information on synchronization signal transmission, like transmission frequency index, which indicates a frequency position at which the synchronization signal is transmitted; beam index, which indicates the beam for transmitting the synchronization; cell identity, which indicate the cell to which the eNB transmitting the synchronization signal belongs; cyclic prefix length, which indicates the length for the CP; and duplex mode in which the synchronization signal is transmitted, other information, or the combination thereof.

For illustration purposes, FIGS. 7 to 18 illustrate several example signal transmission patterns for synchronization signal transmission in the time or frequency domain according to embodiments of the present disclosure and hereinafter, description will made to the signal transmission pattern with reference to FIGS. 7 to 18.

Figure 7:
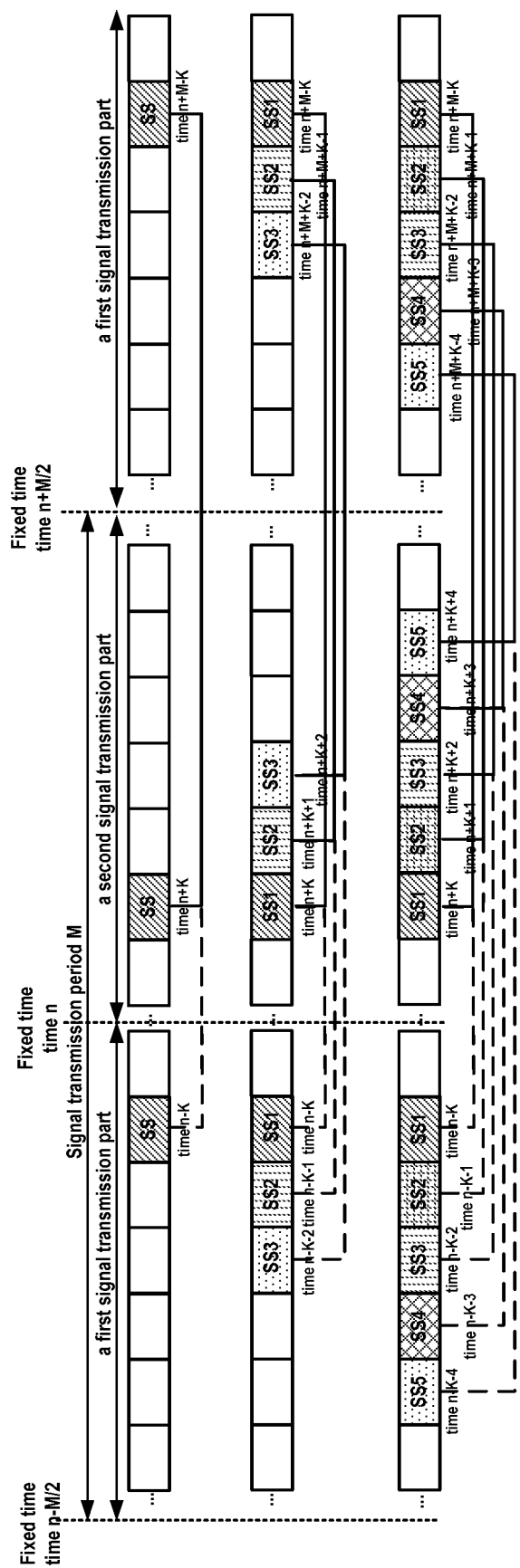
FIG. 7 schematically illustrates a signal transmission pattern for synchronization signal transmission in a time domain according to an example embodiment of the present disclosure.

FIG. 7 illustrates a general signal transmission pattern for the synchronization signal transmission in the time domain according to an example of the present disclosure. As illustrated in FIG. 7, there are illustrated three scenarios for three different deployments. In the first scenario, for the single beam based deployment, the signal set includes one signal SS; in the second scenario, the signal set includes three signals SS1, SS2 and SS3; in the third scenario, the signal set includes five signals, SS1, SS2, SS3, SS4 and SS5. In FIG. 7, in each of the scenarios, the synchronization signals are transmitted with a predetermined signal pattern within a signal transmission period M. The signal transmission period M comprises a first signal transmission part and the second signal transmission part. Synchronization signals for the first synchronization signal transmission part and synchronization signals for the second synchronization signal transmission part have a central symmetry therebetween.

As illustrated in FIG. 7, in the first scenario, the synchronization signal SS is transmitted at time n−k and time n+k, time n+k+M, and so on. Thus, the signal transmission has fixed symmetric center such as time n. In the first scenario, the synchronization signal SS1 is transmitted at time n−k and time n+k, time n+k+M, the synchronization signal SS2 is transmitted at time n−k−1 and time n+k+1, time n+k+1+M, and the synchronization signal SS3 is transmitted at time n−k−2 and time n+k+2, time n+k+2+M. Hence, the signal transmission also has a fixed symmetric center such as time n. Similarly, for the third scenario, the synchronization signals SS1 to SS3 are transmitted at the same timing as those in the second scenario; the synchronization signal SS4 is transmitted at time n−k−3 and time n+k+3, time n+k+3+M, and the synchronization signal SS5 is transmitted at time n−k−4 and time n+k+4, time n+k+4+M. In such a case, the signal transmission also has a fixed symmetric center such as time n. Thus, it can be seen that in each of the three scenarios, the symmetric center is a fixed time, i.e., time n. The fixed time position can be a position known by both the eNB or the UE. The UE can blindly detect two SS and determine the symmetric center which indicates the fixed time position, for example any of symbol 0, 3, 7, 11 within a subframe. Therefore, the symmetric can be used to indicate the information on synchronization signal transmission like the transmission time index since it may ensure there is always a fixed position even for different numbers of beams.

In an embodiment of the present disclosure, the one or more synchronization signals can be transmitted with one or more directional beams, and the predetermined signal transmission pattern includes a predetermined beam transmission pattern transmitted within a downlink transmission part of a subframe. In other word, for the first scenario as illustrated in FIG. 7, the synchronization signal SS can be transmitted with the single beam; for the second scenario, the synchronization signals SS1 to SS3 can be transmitted with three beams B1 to B3 respectively; and for the third scenario, the synchronization signals SS1 to SS5 can be transmitted with three beams B1 to B5 respectively. In such a case, the predetermined signal transmission pattern may be a predetermined beam transmission pattern which is transmitted within a downlink transmission part of a subframe. In addition, it to be noted that the synchronization signals SS1 to SS5 can be synchronization signals with the same synchronization sequence or different synchronization sequences since in such a case, the signal transmission pattern can be expressed by the beam pattern.

In this predetermined signal pattern, all signals in the signal set are transmitted twice and each of synchronization signals SS1 to SS5 has a central symmetry with a symmetric center which is located at a fixed position, for example at a fixed time n. Alternatively, the second signal transmission part and the following first signal transmission part can also form a signal transmission period and in such a case, the fixed symmetric center can also be located at fixed time n+M/2, as illustrated in FIG. 7.

The fixed time position can be any suitable position, for example, a start boundary of a subframe; a fourth symbol within the subframe; a middle point of a subframe; an eleventh symbol within the subframe; an end start of a subframe, or the like.

With the signal transmission pattern as illustrated in FIG. 7, the UE can blindly detect two SSs in the time domain, and calculate the symmetric center of two transmissions, which is used to indicate the transmission time index. That is to say, to learn the transmission time index, the UE only need detect two similar beams and does not need to know which beam it is, or which synchronization sequence is transmitted. In addition, it shall be noted that most of description with reference to FIG. 7 can be also true for the following examples illustrated in FIGS. 9 to 11 unless it is otherwise indicated or impossible to be true.

In another embodiment of the present disclosure, FIG. 8 schematically illustrates an example signal transmission pattern for synchronization signal transmission in the time domain according to an embodiment of the present disclosure. As illustrated in FIG. 8, one or more synchronization signals in the signal set are associated with different directional beams. In other words, different synchronization signals are to be transmitted with different directional beams. For the single beam scenario, the SS is transmitted with a single beam; for the three beams scenario, synchronization signals SS1 to SS3 are transmitted with beams B1 to B3 respectively; for the five beams scenario, synchronization signals SS1 to SS5 are transmitted with beams B1 to B5 respectively. All synchronization signals in the signal set are transmitted twice in the signal transmission period. Within the signal transmission period, the synchronization signals are located towards two sides from the symmetric center and are transmitted in adjacent symbols. In such a case, by receiving two similar synchronization signals and identifying the signal transmission pattern, it can know the fixed symmetric center at the start boundary of symbol n, which can be used to indicate the transmission index.

It can be understand that, the synchronization signal transmission as illustrated in FIG. 8 can be performed in a single subframe 0 within a radio frame, or within two or more adjacent subframes, like subframes 0 and 1. In addition, the transmission of each synchronization signal is not limited to only two, it is possible to transmit the synchronization signals more times as long as a predetermine single pattern can be formed. Moreover, it is unnecessary to transmit the synchronization signals consecutively and it is also possible to transmit synchronization signals with one or more transmission gap there among. It is also possible to transmit the synchronization signals from predetermined positions spaced from the symmetric center instead of immediately from the symmetric center as illustrated in FIG. 8.

Figure 9:
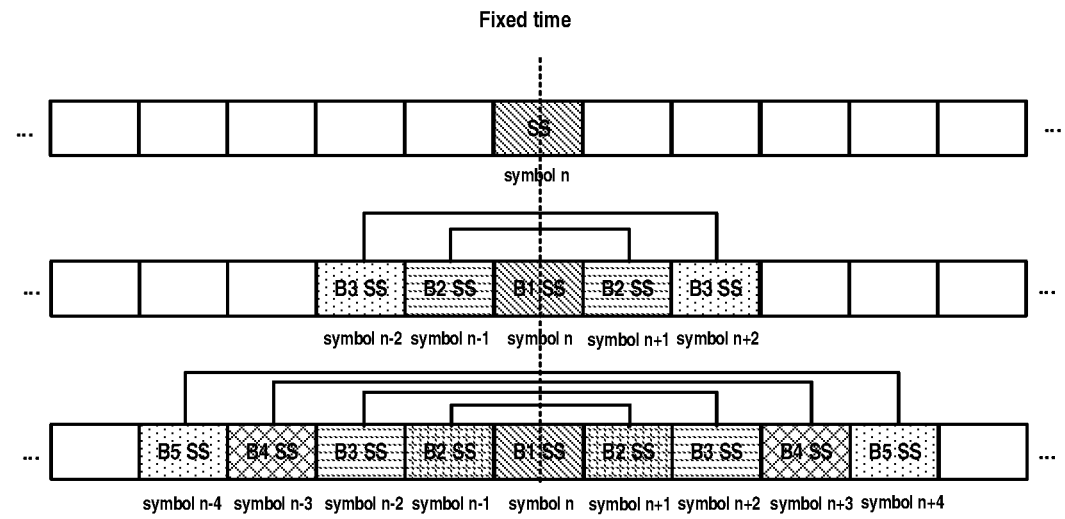
FIG. 9 schematically illustrates another example signal transmission pattern for synchronization signal transmission in the time domain according to an embodiment of the present disclosure.
Figure 10:
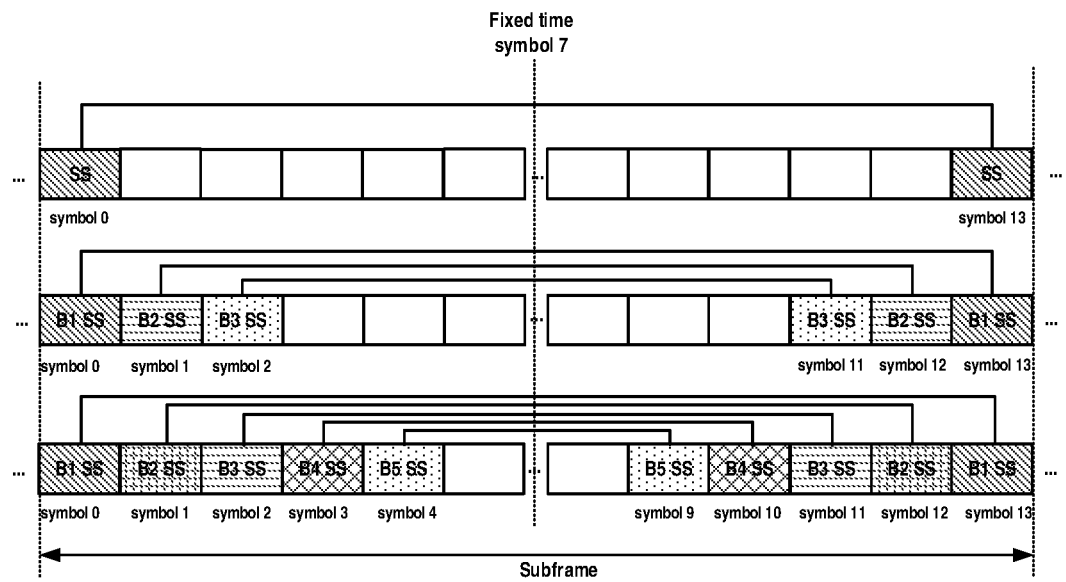
FIG. 10 schematically illustrates a further example signal transmission pattern for synchronization signal transmission in the time domain according to an embodiment of the present disclosure.
Figure 11:
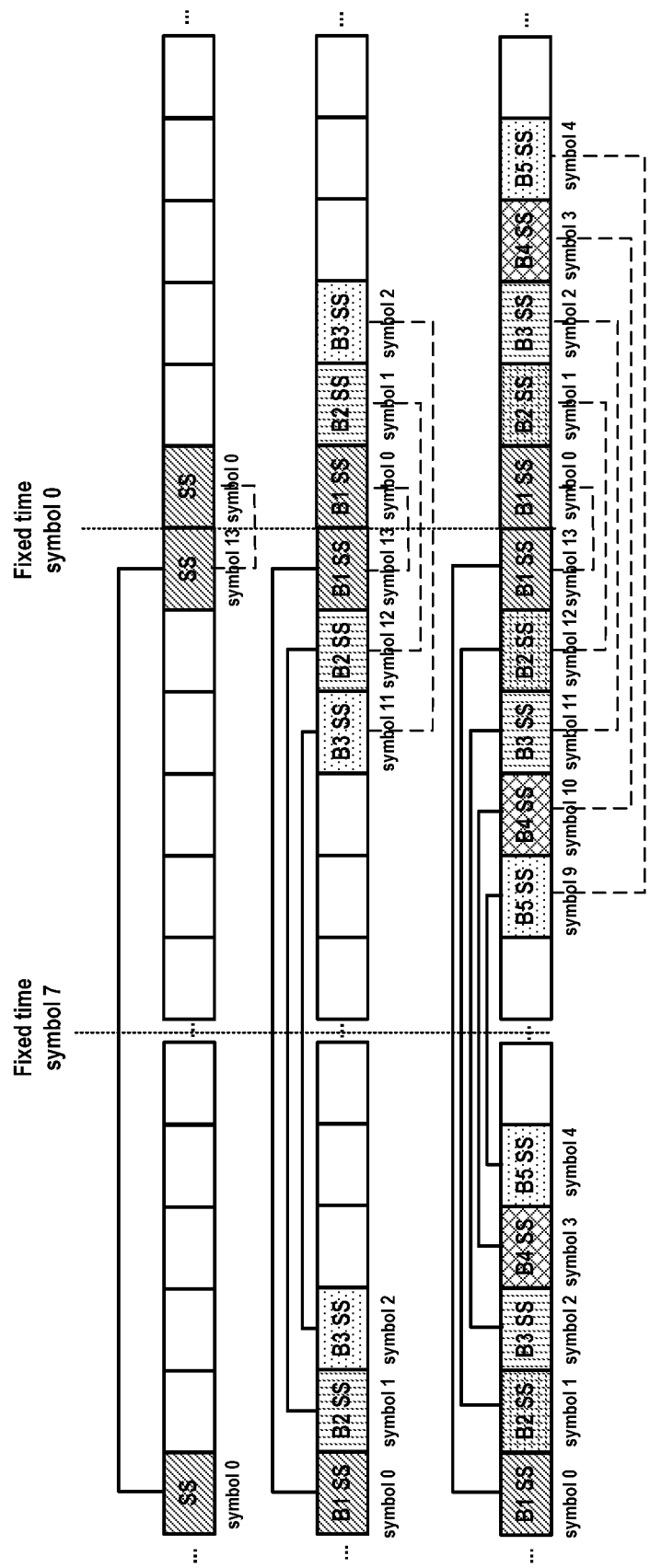
FIG. 11 schematically illustrates a still further example signal transmission pattern for synchronization signal transmission in the time domain according to an embodiment of the present disclosure.

In another embodiment of the present disclosure, it shall be noted that most of description with reference to FIG. 8 can be also true for the following examples illustrated in FIGS. 9 to 11 unless it is otherwise indicated or impossible to be true and for purpose of simplification, same description will be not made to FIGS. 9 to 11.

FIG. 9 further schematically illustrates another example signal transmission pattern for synchronization signal transmission in the time domain according to an embodiment of the present disclosure. The pattern as illustrated in FIG. 9 is substantially similar to that in FIG. 8 with the only difference in that the synchronization signal B1 SS (SS transmitted with beam B1) or SS is transmitted only once and thus it is located on the symmetric center of the signal transmission pattern. In other words, B1 SS or SS is transmitted only once and it has a self-symmetry with its center on the fixed symmetric center.

FIG. 10 schematically illustrates a further example signal transmission pattern for synchronization signal transmission in the time domain according to an embodiment of the present disclosure. Different from FIG. 8, in the solution as illustrated in FIG. 10, within the signal transmission period, the synchronization signals are located towards inside from both boundaries of a subframe. In such a case, it has a symmetric center at a start boundary of symbol 7 within a subframe. However, it shall be appreciated that it is also possible to the synchronization signals are located towards inside from the middle point of a subframe and the middle point of the following subframe, which means the symmetric center located at a start boundary of the following subframe. Other symbol positions are also possible, for example the middle point of a first time slot or a second time slot within a subframe.

In another embodiment of the present disclosure, for the solution as illustrated in FIG. 10, there are actually two potential fixed points, which are illustrated in FIG. 11 for illustration purpose. As illustrated in FIG. 11, if it is observed from a longer signal transmission interval, the second signal transmission part and the following first signal transmission part can also form a signal transmission period which is similar to that of FIG. 8 with a symmetric center at symbol 0, i.e., the start boundary of a subframe. In such a case, it may select any of the two potential points as a fixed point for the signal transmission pattern as long as this is learned at both the eNB and the UE.

Figure 12:
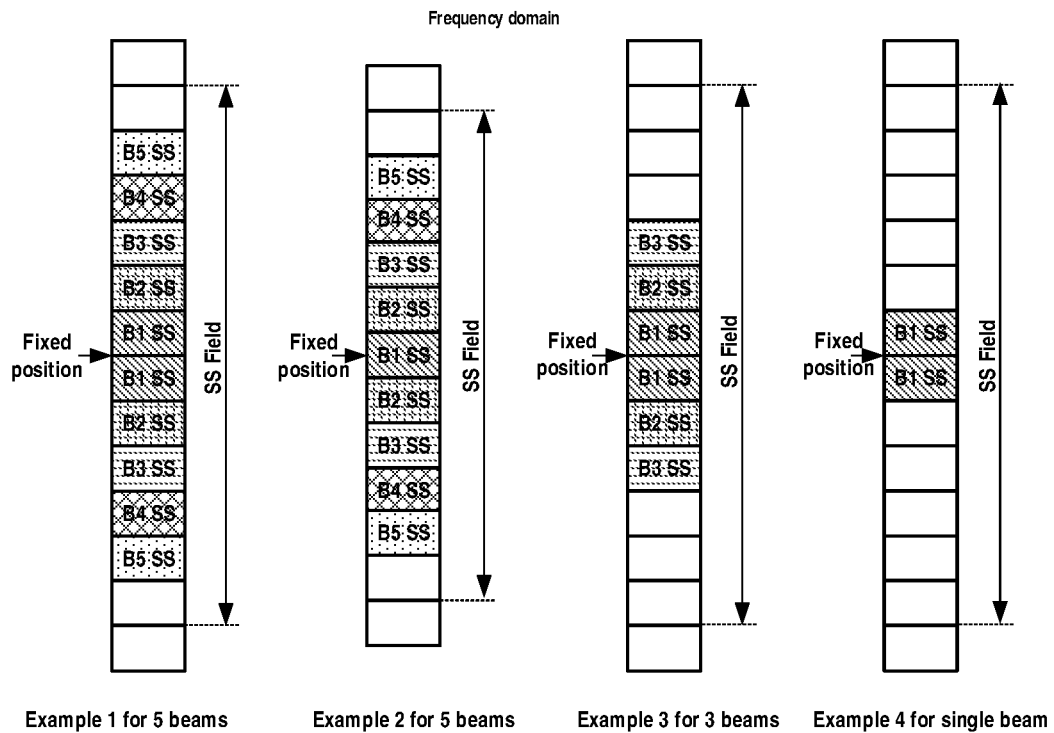
FIG. 12 schematically illustrates another example signal transmission pattern for synchronization signal transmission in a frequency domain according to an embodiment of the present disclosure.

Hereinabove, the signal transmission pattern in the time domain is described but in fact it is not limited to only the time domain. FIG. 12 schematically illustrates a still further example signal transmission pattern for synchronization signal transmission in a frequency domain according to an embodiment of the present disclosure. As illustrated in FIG. 12, different beamformed SS multiplexed in FDM, there is a predefined fixed point for SS field in the frequency domain, which is known by both the eNB and the UE. In such a case, the number of beamformed SS for the UE can be flexible and transparent to the UE. As illustrated in FIG. 12, SS from the same beam are symmetric and the middle point thereof is at the fixed frequency position. In other words, the eNB can transmit each of SS from the same beam twice with a middle point at the fixed frequency point. Or similarly to the case in the time domain, the eNB transmits each of SS from the same beam twice except an SS is located at the fixed frequency point, as illustrated by example 2 in FIG. 12.

In another embodiment of the present disclosure, the UE can blindly detect all the beamformed SS in the time domain to acquire the time synchronization position, and then detect the beamformed SS in the frequency domain to learn the transmission frequency index as the middle of the two SS in frequency domain is fixed. Thus, the frequency synchronization position can be obtained without knowing which index of the beamformed SS.

In another embodiment, in general description, synchronization signal SSi is transmitted at time n−ki and time n+ki with the fixed middle time position n in time domain. And in another embodiment of the present disclosure, synchronization signal SSi is transmitted at frequency n−ki and frequency n+ki with the fixed middle frequency position n in frequency domain.

In another embodiment of the present disclosure, the signal set is further divided into at least two groups, wherein a synchronization signal in each of the groups is transmitted with a transmission interval different from another group, and the transmission interval indicates the information on synchronization signal transmission. The synchronization signal in each of the groups can be transmitted with one or more directional beams different from another group. For illustration purposes, reference will be made to FIGS. 13 and 14 to describe the solution in which the transmission interval is used to indicate the information on synchronization signal transmission.

Figure 13:
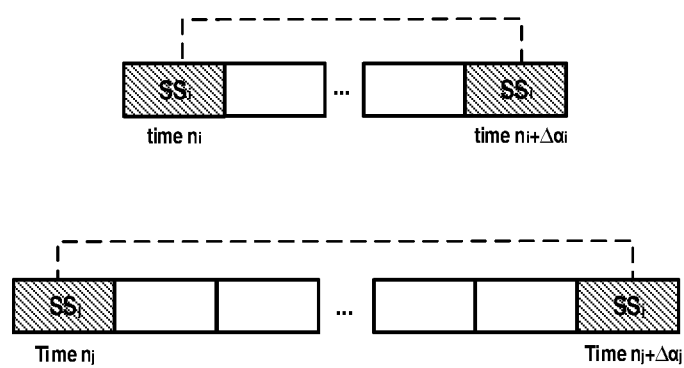
FIG. 13 schematically illustrates a further signal transmission pattern for synchronization signal transmission in the time domain according to an embodiment of the present disclosure.

FIG. 13 schematically illustrates another signal transmission pattern for synchronization signal transmission in the time domain according to an example embodiment of the present disclosure. In the embodiment as illustrated in FIG. 13, the signal set is further divided into at least two groups, wherein a synchronization signal in each of the groups is transmitted with a transmission time offset different from another group, and the transmission time offset indicates the information on synchronization signal transmission. In other words, in the time domain, transmission time position relationship of the beamformed SS within one signal group is different from other signal groups. For example, the signal set can be divided into L (L>=1) signal groups, each signal group transmits 2 or more SS signals, and for each group, the time interval of the 2 or more transmissions is different with each other. Each signal group can be associated with different beams from another signal group. For example, synchronization signal in signal group Gi (i=1 . . . L) can be transmitted with a first beam using a first time offset while synchronization signal in signal group Gj (i=1 . . . M) can be transmitted with a second time offset different from the first time offset. As illustrated in FIG. 13, the first synchronization signal in the signal group Gi is transmitted with beam Bi at time ni, the second synchronization signal in Gi is transmitted with beam Bi at time $n_i+\Delta\alpha_i$; while the first synchronization signal in the signal group Gj is transmitted with beam Bj at time nj, the second synchronization signal in Gj is transmitted with beam Bj at time $n_i+\Delta\alpha_j$.

The two synchronization signal transmission in a group can be the same, and there will be two potential time offsets for the two transmissions. Thus, UE can further obtain the exact index further by another signal or information. For example, the time offset can be limited to a particular range and only one of the two potential time offsets is within the range. In another embodiment of the present disclosure, the two synchronization signal transmissions are different, and UE knows the difference (e.g. different base sequences, different Cyclic shift values, etc.) Thus, the time offset of the two transmission can fixed to $\Delta\alpha_i$ or $M-\Delta\alpha_i$ (M is the signal transmission period in the frequency domain). Thus, by means of the difference of synchronization signals used in two transmissions, the UE can know which index of the symbol is.

In such a way, the UE can blindly detect two synchronization signals in the time duration, calculates the time offset of the two signal transmissions, and thus get the beam information with the different time offset values.

Figure 14:
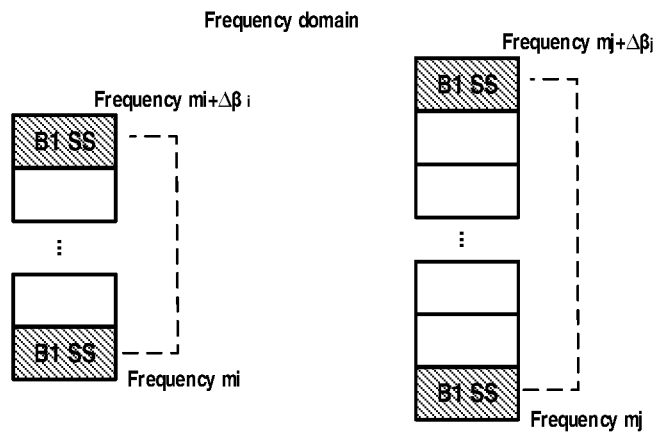
FIG. 14 schematically illustrates a still further signal transmission pattern for synchronization signal transmission in the frequency domain according to an embodiment of the present disclosure.

FIG. 14 further schematically illustrates another signal transmission pattern for synchronization signal transmission in the frequency domain according to an example embodiment of the present disclosure. In the embodiment as illustrated in FIG. 14, the signal set is further divided into at least two groups, wherein a synchronization signal in each of the groups is transmitted with a transmission frequency offset different from another group, and the transmission frequency offset indicates the information on synchronization signal transmission. In other words, in the frequency domain, transmission frequency position relationship of the beamformed SS within one beam group is different from other groups. For example, the signal set can be divided into L (L>=1) signal groups, each signal group transmits 2 or more SS signals, and for each group, the frequency offset of the 2 or more transmissions can be different with each other. Each signal group can be associated with different beams from another signal group. For example, synchronization signal in signal group Si (i=1 . . . L) can be transmitted with a first beam using a first frequency offset while synchronization signal in signal group Gj (i=1 . . . L) can be transmitted with a second beam using a second frequency offset different from the first frequency offset. As illustrated in FIG. 14, the first synchronization signal in the signal group Gi is transmitted with beam Bi at frequency position $m_i$, the second synchronization signal in Gi is transmitted with beam Bi at a frequency position $m_i+\Delta\beta_i$; while the first synchronization signal in the signal group Gj is transmitted with beam Bj at a frequency position mj, the second synchronization signal in Gj is transmitted with beam Bj at frequency position $mi+\Delta\beta_j$.

In an embodiment of the present disclosure, the two synchronization signals can be the same, and there might be two potential frequency offsets for the two transmissions. Thus, UE can further obtain the exact index further by means of another signal or information. For example, the frequency offset can be limited to a particular range and only one of the two potential frequency offsets is within the range. In another embodiment of the present disclosure, the two synchronization signals are different, and UE knows the difference (e.g. different base sequences, different Cyclic shift values, etc.), the frequency offset of the two transmissions can be fixed to $\Delta\beta i$ or $M-\Delta\beta i$ (M is the signal transmission period in the frequency domain). Thus, by means of the difference of synchronization signals used in two transmissions, the UE can know which index of the transmission frequency is. In such a way, UE can blindly detect two SS in the frequency domain, calculates the frequency offset of the two transmissions and thus get the information on the beam information with the different frequency offset values.

Figure 15:
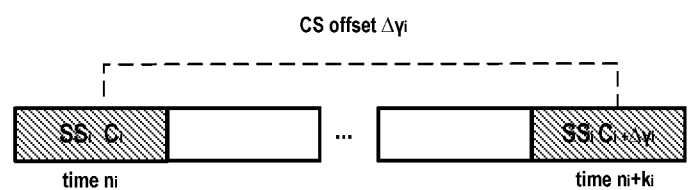
FIG. 15 schematically illustrates a yet further signal transmission pattern for synchronization signal transmission in the time domain according to an embodiment of the present disclosure.

FIG. 15 schematically illustrates another signal transmission pattern for synchronization signal transmission in the frequency domain according to a further embodiment of the present disclosure. As illustrated in FIG. 15, it is also possible to use different cyclic shift (CS) shift to indicate information on synchronization signal transmission. For example, the signal set can be divided into L (L>=1) signal groups, each signal group transmits 2 or more SS signals, and for each group, the CS shift of the 2 or more transmissions in a signal group can be different from another group. Each signal group can be associated with different beams from another signal group. For example, the synchronization signal in signal group Si (i=1 . . . L) can be transmitted with a first CS shift while synchronization signal in signal group Gj (i=1 . . . L) can be transmitted with a second CS shift different from the first CS shift. For example, the first synchronization signal in the signal group Gi is transmitted at time ni with CS shift Ci, the second synchronization signal in Gi is transmitted at time ni+ki with a CS shift $Ci+\Delta\gamma_i$; while the first synchronization signal in the signal group Gj is transmitted at time nj with a CS shift Cj, the second synchronization signal in Gj is transmitted at time ni+ki with CS shift $C_j+\Delta\gamma_j$ ($\Delta\gamma_j\neq\Delta\gamma i$) and wherein Ci and Cj are predefined. In addition, Ki>=0 and is an integer and can be same or different for different beam groups.

Figure 16:
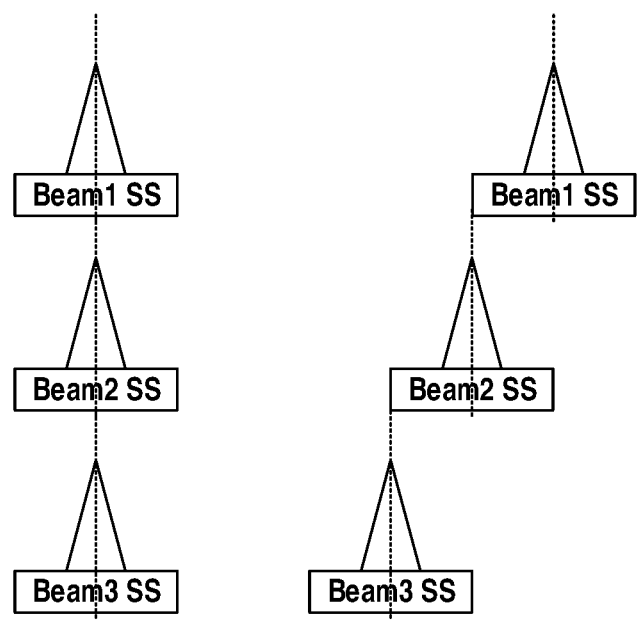
FIG. 16 schematically illustrates different peak positions with difference CS shifts for different signal groups for synchronization signal transmission according to an embodiment of the present disclosure.

In an example embodiment of the present disclosure, the UE can blindly detect synchronization signals in the time domain to get the peak position, then detects next synchronization signals to get another peak position, the peak positions have an offset within a symbol corresponding to the CS value, as illustrated in FIG. 16, which illustrates examples of different peak positions with different CS shifts for synchronization signals transmitted by different beams.

In an example embodiment of the present disclosure, the UE could detect the peak position and get the received signals to obtain the phase shift in the frequency domain.

Figure 17:
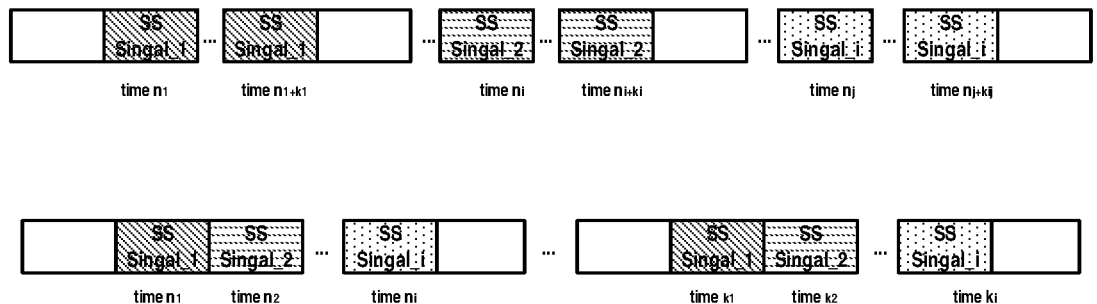
FIG. 17 schematically illustrates another signal transmission pattern for synchronization signal transmission in the time domain according to an embodiment of the present disclosure.
Figure 18:
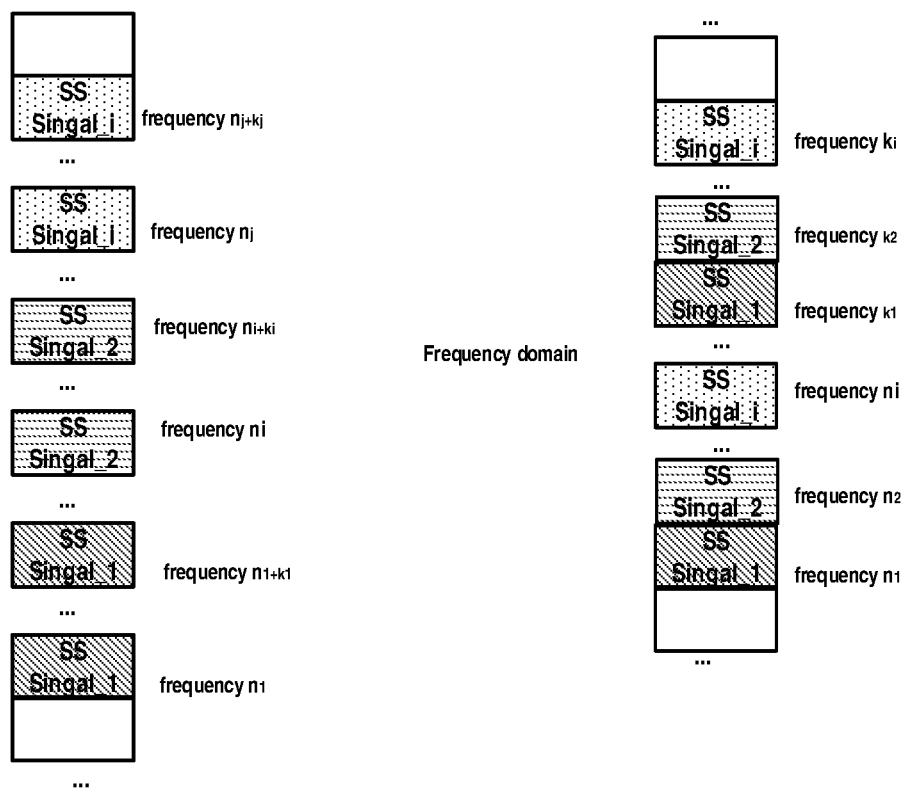
FIG. 18 schematically illustrates a further signal transmission pattern in the frequency domain according to an embodiment of the present disclosure.

In another embodiment, it is also possible to further divide the signal set into different groups and a synchronization signal in each of the groups is transmitted using a synchronization signal sequence different from another group. In such a case, the synchronization signal sequence can be used to indicate the information on synchronization signal transmission. Particularly, the synchronization signal in each of the groups is transmitted with one or more directional beams different from another group. In other words, different signals are transmitted on different time intervals or different frequency ranges, but the relationship of time interval/frequency range index and signal is predefined. For example, different signals are transmitted with different beams which can be mapped to one or several time intervals; or alternatively, there are different beam groups each group transmitting different signals. For example, subframe, in a time/frequency positions ni, ni+ki, signal SSi is transmitted using a synchronization sequence Si while in a time/frequency positions nj and nj+kj, signal SSj is transmitted using a synchronization sequence Sj, as illustrated in FIG. 17 by the top drawing and FIG. 18 by the left drawing. In addition, it is also possible that in a time/frequency positions ni, ki, signal SSi is transmitted using a synchronization sequence Si while in a time/frequency positions nj and kj, signal SSj is transmitted using a synchronization sequence Sj as illustrated in FIG. 17 by the bottom drawing and FIG. 18 by the right drawing. Thus, by means of different synchronization sequence sequences, it may identify beam information or other information on synchronization signal transmission.

In another embodiment, the synchronization signals can be hopping for different transmission period.

In another embodiment, the synchronization signals can be spatial division multiplexing with different precoding matrix. For example, some synchronization signals are transmitted in the same time, and different beams are separated with different precoding matrix. In addition, the synchronization signal sequences can be different for different beam directions.

Figure 19:
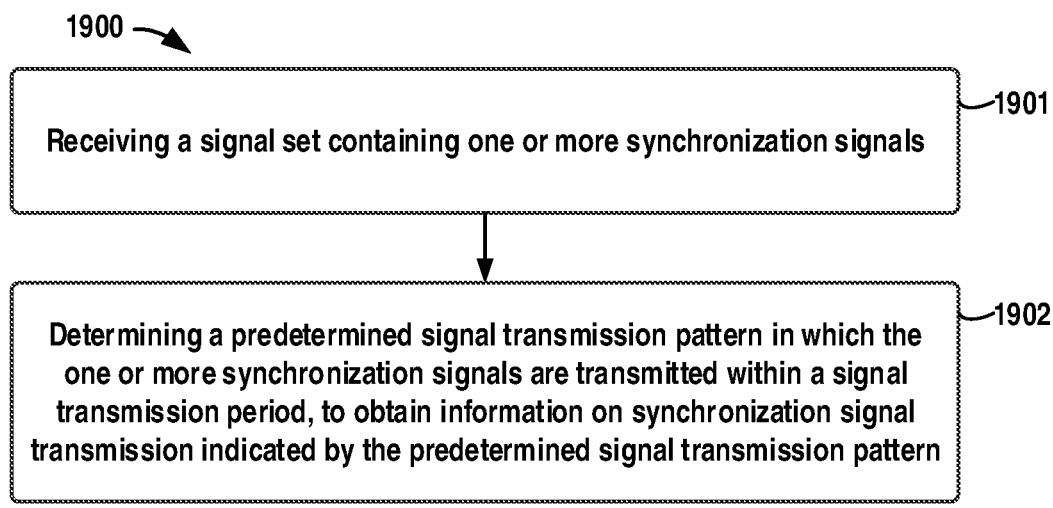
FIG. 19 schematically illustrates a flow chart of a method for synchronization signal receiving according to an embodiment of the present disclosure.

FIG. 19 further schematically illustrates a flow chart of method for synchronization signal receiving according to an example embodiment of the present disclosure. The method 1900 can be implemented at a terminal device, for example UE, or other like terminal devices.

As illustrated in FIG. 19, the method starts from step 1901, in which the UE receives a signal set containing one or more synchronization signals. In an embodiment of the present disclosure, the UE can receive the one or more synchronization signals from one or more directional beams, and the predetermined signal transmission pattern includes a predetermined beam transmission pattern transmitted within a downlink transmission part of a subframe.

In an embodiment of the present disclosure, all synchronization signals in the signal set can be received at least twice in the signal transmission period. Or alternatively, all synchronization signals in the signal set can be received at least twice in the signal transmission period except a synchronization signal at the symmetric center.

In a further embodiment of the present disclosure, the signal set can be further divided into at least two groups. The synchronization signal in each of the groups can be received with a transmission interval different from another group, and the transmission interval indicates the information on synchronization signal transmission. The transmission interval may include a transmission interval in any of the time domain or the frequency domain.

In another embodiment of the present disclosure, the signal set can be further divided into at least two groups. The synchronization signal in each of the groups can be received, which is transmitted using a synchronization signal sequence different from another group, and the synchronization signal sequence indicates the information on synchronization signal transmission.

In another embodiment of the present disclosure, a synchronization signal in each of the groups is received from one or more directional beams different from another group.

In an embodiment of the present disclosure, within the signal transmission period, the synchronization signals are located towards inside from both boundaries of a subframe. Or alternatively, in the signal transmission period, synchronization signals are located towards two sides from the symmetric center or from predetermined positions spaced from the symmetric center.

Then at step 1902, the UE determines a predetermined signal transmission pattern in which the one or more synchronization signals are transmitted within a signal transmission period, to obtain information on synchronization signal transmission indicated by the predetermined signal transmission pattern.

In an embodiment of the present disclosure, the signal transmission period may include a first synchronization signal transmission part and a second synchronization signal transmission part. In such a case, it may identify central symmetry between synchronization signals for the first synchronization signal transmission part and synchronization signals for the second synchronization signal transmission part, to obtain the information on synchronization signal transmission from a symmetric center.

In an embodiment of the present disclosure, the symmetric center can be located at any of: a start boundary of a subframe; a fourth symbol within the subframe; a middle point of a subframe; an eleventh symbol within the subframe; or an end start of a subframe.

In another embodiment of the present disclosure, the predetermined beam pattern may comprise a beam pattern in any of a time domain or a frequency domain.

In a further embodiment of the present disclosure, the information on synchronization signal transmission comprises one or more of: transmission time index; transmission frequency index; beam index; cell identity; and duplex mode.

Hereinabove, the method of synchronization at a terminal device is briefly described with reference to FIG. 19 and many details about the operations and features in the method are similar to the method at the severing node. Thus, for details, reference can be made to corresponding description with reference to FIGS. 6 to 19.

In such a way, it is possible to use the signal transmission pattern to indicate information on synchronization signal transmission like transmission time index, transmission frequency index; beam index; cell identity; duplex mode; other information on synchronization signal transmission; or any combination thereof. Thus, especially for an initial access process, it can provide a common frame for both single beam based deployment and multi-beam based deployment.

Besides, in the present disclosure, there are also provided apparatuses for synchronization signal transmission and receiving at the serving node and terminal device in a wireless communication system respectively, which will be described next with reference to FIGS. 20 and 21.

Figure 20:
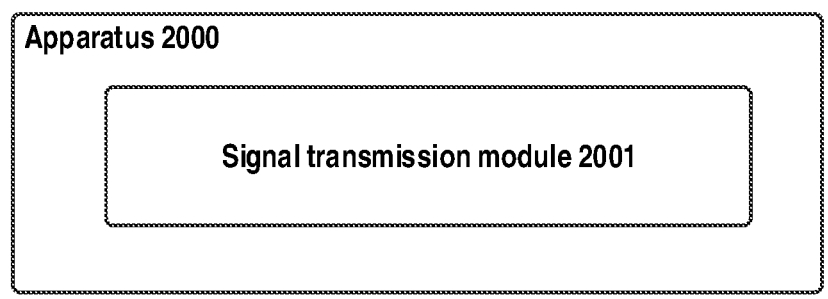
FIG. 20 schematically illustrates a block diagram of an apparatus for synchronization signal transmission according to an embodiment of the present disclosure.

FIG. 20 schematically illustrates a block diagram of an apparatus 2000 for synchronization signal transmission in a wireless communication system according to an embodiment of the present disclosure. The apparatus 2000 can be implemented at a serving node, for example a BS, like a node B (NodeB or NB).

As illustrated in FIG. 20, the apparatus 2000 may comprise a signal transmission module 2001, which can be configured to transmit a signal set containing one or more synchronization signals. Particularly, the signal transmission module 2001 can be further configured to transmit the one or more synchronization signals in a predetermined signal transmission pattern within a signal transmission period, and wherein the predetermined signal transmission pattern indicates information on synchronization signal transmission.

In an embodiment of the present disclosure, the signal transmission module 2001 can be further configured to transmit the one or more synchronization signals with one or more directional beams, and the predetermined signal transmission pattern includes a predetermined beam transmission pattern transmitted within a downlink transmission part of a subframe.

In another embodiment of the present disclosure, the signal transmission period can include a first synchronization signal transmission part and a second synchronization signal transmission part, wherein synchronization signals for the first synchronization signal transmission part and synchronization signals for the second synchronization signal transmission part have a central symmetry therebetween, with a symmetric center indicating the information on synchronization signal transmission.

In a further embodiment of the present disclosure, all synchronization signals in the signal set can be transmitted at least twice in the signal transmission period. In another optional embodiment of the present disclosure, all synchronization signals in the signal set can be transmitted at least twice in the signal transmission period except a synchronization signal at the symmetric center.

In a still further embodiment of the present disclosure, the symmetric center can be located at any of a start boundary of a subframe; a fourth symbol within the subframe; a middle point of a subframe; an eleventh symbol within the subframe; or an end start of a subframe.

In a yet further embodiment of the present disclosure, within the signal transmission period, the synchronization signals can be located towards inside from both boundaries of a subframe. In another optional embodiment of the present disclosure, within the signal transmission period, the synchronization signals can be located towards two sides from the symmetric center or from predetermined positions spaced from the symmetric center.

In another embodiment of the present disclosure, the signal set can be further divided into at least two groups, wherein the signal transmission module 2001 can be further configured to transmit a synchronization signal in each of the groups with a transmission interval different from another group, and the transmission interval can indicate the information on synchronization signal transmission.

In a further embodiment of the present disclosure, the signal set can be further divided into at least two groups, wherein the signal transmission module 2001 can be further configured to transmit a synchronization signal in each of the groups using a synchronization signal sequence different from another group, and the synchronization signal sequence can indicate the information on synchronization signal transmission.

In a further embodiment of the present disclosure, the synchronization signal in each of the groups can be transmitted with one or more directional beams different from another group.

In still further embodiment of the present disclosure, the predetermined signal pattern may comprise a signal pattern in a time domain. Alternatively or in addition, the predetermined signal pattern may comprise a signal pattern in a frequency domain.

In still further embodiment of the present disclosure, the information on synchronization signal transmission comprises one or more of: transmission time index; transmission frequency index; beam index; cell identity; and duplex mode.

Figure 21:
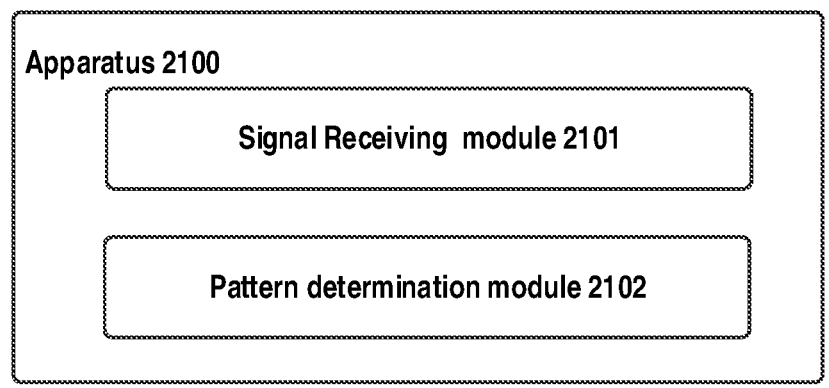
FIG. 21 schematically illustrates a block diagram of an apparatus for synchronization signal receiving according to an embodiment of the present disclosure.

FIG. 21 further schematically illustrates a block diagram of an apparatus 2100 for synchronization signal receiving in a wireless communication system according to an embodiment of the present disclosure. The apparatus 2100 can be implemented at a terminal device, for example UE, or other like terminal devices.

As illustrated in FIG. 21, the apparatus 2100 may include a signal receiving module 2101 and a pattern determination module 2102. The signal receiving module 2101 can be configured to receive a signal set containing one or more synchronization signals. The pattern determination module 2102 can be configured to determine a predetermined signal transmission pattern in which the one or more synchronization signals are transmitted within a signal transmission period, to obtain information on synchronization signal transmission indicated by the predetermined signal transmission pattern.

In an embodiment of the present disclosure, the signal transmission module can be further configured to transmit the one or more synchronization signals with one or more directional beams, and the predetermined signal transmission pattern may include a predetermined beam transmission pattern transmitted within a downlink transmission part of a subframe.

In another embodiment of the present disclosure the signal transmission period may include a first synchronization signal transmission part and a second synchronization signal transmission part, and the pattern determination module 2102 may be further configured to: identify central symmetry between synchronization signals for the first synchronization signal transmission part and synchronization signals for the second synchronization signal transmission part, to obtain the information on synchronization signal transmission from a symmetric center.

In an embodiment of the present disclosure, all synchronization signals in the signal set can be received at least twice in the signal transmission period. In an another optional embodiment of the present disclosure, all synchronization signals in the signal set can be received at least twice in the signal transmission period except a synchronization signal at the symmetric center.

In a further embodiment of the present disclosure, the symmetric center can be located at any of: a start boundary of a subframe; a fourth symbol within the subframe; a middle point of a subframe; an eleventh symbol within the subframe; or an end start of a subframe.

In a still further embodiment of the present disclosure, within the signal transmission period, the synchronization signals can be located towards inside from both boundaries of a subframe. In an alternative embodiment of the present disclosure, within the signal transmission period, synchronization signals can be located towards two sides from the symmetric center or from predetermined positions spaced from the symmetric center.

In a yet further embodiment of the present disclosure, the signal set can be further divided into at least two groups, and wherein the signal receiving module 2101 can be further configured to receive the synchronization signal in each of the groups which is transmitted with a transmission interval different from another group, and the transmission interval can indicate the information on synchronization signal transmission.

In another further embodiment of the present disclosure, the signal set can be further divided into at least two groups, and wherein the signal receiving module 2101 can be further configured to receive the synchronization signal in each of the groups which is transmitted using a synchronization signal sequence different from another group, and the synchronization signal sequence can indicate the information on synchronization signal transmission.

In a further embodiment of the present disclosure, the synchronization signal in each of the groups can be received from one or more directional beams different from another group.

In a still further embodiment of the present disclosure, the predetermined beam pattern comprises a beam pattern in any of a time domain or a frequency domain.

In a yet further embodiment of the present disclosure, the information on synchronization signal transmission comprises one or more of: transmission time index; transmission frequency index; beam index; cell identity; and duplex mode.

Hereinbefore, the apparatuses 2000 and 2100 are described with reference to FIGS. 20 and 21. It is noted that the apparatuses 2000 and 2100 may be configured to implement functionalities as described with reference to FIGS. 6 to 19. Therefore, for details about the operations of modules in these apparatuses, one may refer to those descriptions made with respect to the respective steps of the methods with reference to FIGS. 6 to 19.

It is further noted that the components of the apparatuses 2000 and 2100 may be embodied in hardware, software, firmware, and/or any combination thereof. For example, the components of apparatuses 2000 and 2100 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure. For example, reference is made to the transmission time index in many of the embodiments as described herein but the present disclosure is not limited thereto, it is also possible to use the signal transmission pattern to indicate other information on synchronization signal transmission like transmission frequency index; beam index; cell identity; duplex mode; and so on. In addition, the signal transmission patterns in the time domain are mainly described in embodiments of the present disclosure, but the skilled in the art can understood that similar pattern can also be used in the frequency domain.

In addition, in some embodiment of the present disclosure, apparatuses 2000 and 2100 may comprise at least one processor. The at least one processor suitable for use with embodiments of the present disclosure may include, by way of example, both general and special purpose processors already known or developed in the future. Apparatuses 2000 and 2100 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 2000 and 2100 to at least perform operations according to the method as discussed with reference to FIGS. 6 to 19 respectively.

Figure 22:
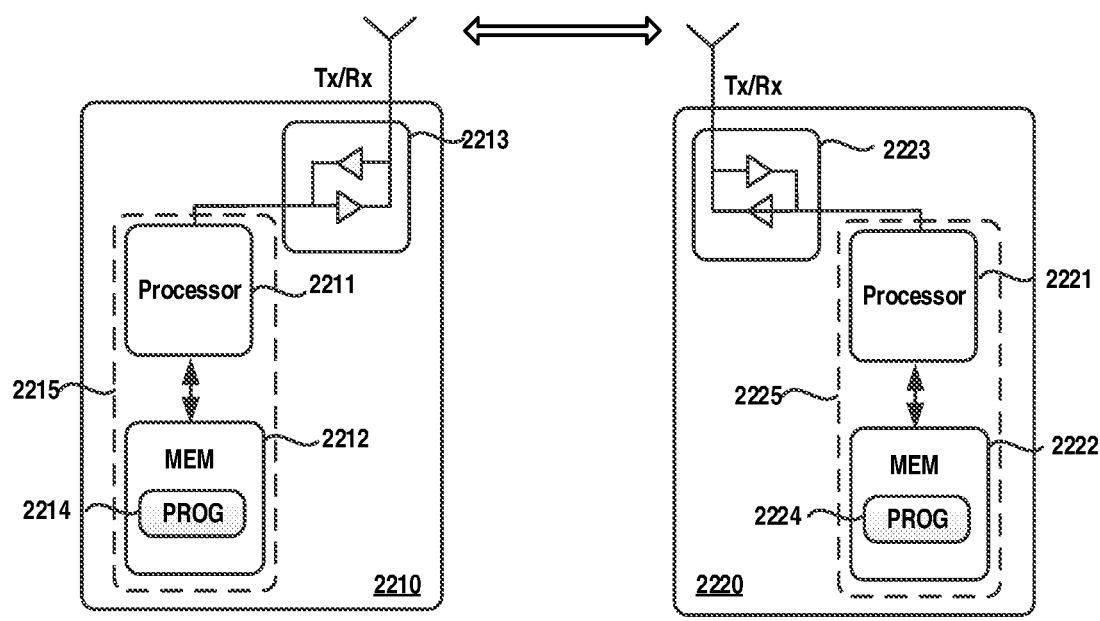
FIG. 22 further illustrates a simplified block diagram of an apparatus 2210 that may be embodied as or comprised in a serving node like a base station in a wireless network and an apparatus 2220 that may be embodied as or comprised in a terminal device like UE as described herein.

FIG. 22 further illustrates a simplified block diagram of an apparatus 2210 that may be embodied as or comprised in a serving node like a base station in a wireless network and an apparatus 2220 that may be embodied as or comprised in a terminal device like UE as described herein.

The apparatus 2210 comprises at least one processor 2211, such as a data processor (DP) and at least one memory (MEM) 2212 coupled to the processor 2211. The apparatus 2210 may further comprise a transmitter TX and receiver RX 2213 coupled to the processor 2211, which may be operable to communicatively connect to the apparatus 2220. The MEM 2212 stores a program (PROG) 2214. The PROG 2214 may include instructions that, when executed on the associated processor 2211, enable the apparatus 2210 to operate in accordance with embodiments of the present disclosure, for example the method 600. A combination of the at least one processor 2211 and the at least one MEM 2212 may form processing means 2215 adapted to implement various embodiments of the present disclosure.

The apparatus 2220 comprises at least one processor 2221, such as a DP, and at least one MEM 2222 coupled to the processor 2221. The apparatus 2220 may further comprise a suitable TX/RX 2223 coupled to the processor 2221, which may be operable for wireless communication with the apparatus 2210. The MEM 2222 stores a PROG 2224. The PROG 2224 may include instructions that, when executed on the associated processor 2221, enable the apparatus 2220 to operate in accordance with the embodiments of the present disclosure, for example to perform the method 1900. A combination of the at least one processor 2221 and the at least one MEM 2222 may form processing means 2225 adapted to implement various embodiments of the present disclosure.

Various embodiments of the present disclosure may be implemented by computer program executable by one or more of the processors 2211, 2221, software, firmware, hardware or in a combination thereof.

The MEMs 2212 and 2222 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 2211 and 2221 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method, performed by a terminal device, the method comprising:
    receiving, from a network device, a first group of primary synchronization signals and a second group of primary synchronization signals,
    wherein:
        a beam for a first primary synchronization signal at a first time is the same as a beam for a second primary synchronization signal at a second time, in each of the first group and the second group,
        the second time is based on the first time and a transmission interval, and
        a signal sequence of a primary synchronization signal in the first group is different from a signal sequence of a primary synchronization signal in the second group.

2. A method, performed by a terminal device, the method comprising:
    receiving, from a network device, a first group of secondary synchronization signals and a second group of secondary synchronization signals,
    wherein:
        a beam for a first secondary synchronization signal at a first time is the same as a beam for a second secondary synchronization signal at a second time in each of the first group and the second group,
        the second time is based on the first time and a transmission interval, and
        a signal sequence of a secondary synchronization signal in the first group is different from a signal sequence of a secondary synchronization signal in the second group.

3. The method of claim 2, wherein a value of the transmission interval associated with the first group is different from a value of the transmission interval associated with the second group.

4. The method of claim 2, wherein a beam for a secondary synchronization signal in the first group is different from a beam for a secondary synchronization signal in the second group.

5. A terminal device, comprising:
    a receiver configured to receive, from a network device,
        a first group of secondary synchronization signals and
        a second group of secondary synchronization signals,
    wherein:
        a beam for a first secondary synchronization signal at a first time is the same as a beam for a second secondary synchronization signal at a second time in each of the first group and the second group,
        the second time is based on the first time and a transmission interval, and
        a signal sequence of a secondary synchronization signal in the first group is different with a signal sequence of a secondary synchronization signal in the second group.

6. The terminal device of claim 5, wherein a value of the transmission interval associated with the first group is different from a value of the transmission interval associated with the second group.

7. The terminal device of claim 5, wherein a beam for a secondary synchronization signal in the first group is different from a beam for a secondary synchronization signal in the second group.

* * * * *